United States Patent Office 3,539,332
Patented Nov. 10, 1970

3,539,332
PYRAZINE COMPOSITIONS AND METHOD OF USE
Joseph Geronimo, Concord, Calif., assignor to The Dow Chemical Company, Midland, Mich., a corporation of Delaware
No Drawing. Filed Dec. 23, 1968, Ser. No. 786,396
Int. Cl. A01n 9/22
U.S. Cl. 71—92                    10 Claims

ABSTRACT OF THE DISCLOSURE

The present disclosure is concerned with herbicidal pre-emergent control of undesirable plant species and in particular relates to methods and compositions for such use employing as the active growth inhibiting agent one of 2,3,5-trichloro-6-methoxypyrazine or 2,3,5-trichloro-6-(methylthio)pyrazine.

SUMMARY OF THE INVENTION

The present invention relates to plant husbandry and the raising of crops and is particularly concerned with an agronomical practice and composition for improving the emergence, seed germination, seedling growth and harvest of crop plants. This invention also relates to herbicidal compositions and to methods of inhibiting or controlling undesirable plant growth therewith in the presence of important economic crops. Further and more importantly, it relates to the pre-emergence control of seeds and other forms of underirable plant growth in areas employed for crop cultivation.

In accordance with this invention, a method for controlling or inhibiting the growth of undesirable plant species is provided which comprises applying to the planted area to be protected, from such undesirable plant growth, an effective or growth inhibiting amount of at least on of 2,3,5-trichloro-6-methoxypyrazine or 2,3,5-trichloro-6-(methylthio)pyrazine.

In carrying out the process of this invention, the control of undesirable plant growth may be achieved by application of an effective amount of active compound to soil preferably shortly before the weeds emerge, during the process of their germination, or shortly thereafter. For control on crop lands, wherein it is desired that the pyrazine materials not affect the crop, the active material may be applied before the crop has been planted and prior to emergence of the crop or weeds, or it may be applied after the crop has emerged, but prior to weed emergence. Further, weed control may be achieved by application of the active material after the crop has emerged and before the weeds have matured. However, as indicated hereinbefore, application is preferably prior to or shortly after their emergence. Where the crop to be planted is one which is affected by the pyrazine compounds, there should be sufficient time after soil treatment to assure the toxicants dissipation from the area.

The minimum amount of active compound applied should be that which is effective in controlling and/or killing undesirable plant growth. Ordinarily, applications will be made in amounts of from about 0.01 to about 50 pounds of the active compound per acre and normally uniformly good results are achieved with applications in the range of from about 0.5 to about 10 pounds of the active compound per acre.

With respect to one outstanding preferred aspect of this invention, namely the use of the above compounds for the pre-emergence control of undesirable plant growth, concentrations on the order of from about 0.5 to about 10 pounds of the active compound per acre and preferably from about 1 to about 5 pounds of the active compound per acre are employed.

The present invention can be carried out by directly employing the pyrazine compounds singly or in combination with each other. However, the present invention also embraces the employment of liquid, granular, encapsulated or dust compositions containing at least one of said compounds. In such usage, the compound or compounds can be modified with one or more of a plurality of additaments or pesticidal adjuvants including solvents or other liquid carriers, surface active dispersing agents or coarsely or finely divided inert solids. The augmented compositions are also adapted to be employed as concentrates and subsequently diluted with additional inert carrier, to produce other compositions in the form of dusts, sprays, granules, washes or drenches. In compositions where the adjuvant is a coarsely or finely divided solid, a surface active agent or the combination of a surface active agent and a liquid additament, the adjuvant cooperates with the active component so as to facilitate the invention. Whether the composition is employed in liquid form, as a wettable powder, or as a granular or encapsulated material, the active compound will normally be present in an amount of from about 5 to 95 percent by weight of the total composition.

In the preparation of dust compositions, the toxicant products can be compounded with any of the finely divided solids, such as pyrophyllite, talc, chalk, gypsum, fuller's earth, bentonite, attapulgite, and the like. In such operations, the finely divided carrier is ground or mixed with the toxicant or wet with a solution of the toxicant in a volatile organic solvent. Also, such dust compositions when employed as concentrates can be dispersed in water, with or without the aid of dispersing agents to form spray mixtures.

Granular formulations are usually prepared by impregnating a solution of the toxicant in a volatile organic solvent onto a bed of coarsely divided attapulgate, bentonite, diatomite, or the like.

Similarly, the toxicant products can be compounded with a suitable water-immiscible organic liquid and a surface active dispersing agent to produce an emulsifiable concentrate which can be further diluted with water and oil to form spray mixtures in the form of oil-in-water emulsions. In such compositions, the carrier comprises an aqueous emulsion, i.e., a mixture of water-immiscible solvent, emulsifying agent and water. Preferred dispersing agents which can be employed in these compositions, are oil-soluble materials including non-ionic emulsifiers such as the condensation products of alkylene oxides with the inorganic acids, polyoxyethylene derivatives or sorbitan esters, complex ether alcohols and the like. Also, oil-soluble ionic emulsifying agents such as mahogany soaps can be used. Suitable organic liquids which can be employed in the composition include petroleum oils and distillates, toluene, liquid halohydrocarbons and synthetic organic oils. The surface-active dispersing agents are usually employed in liquid composition and in the amount of from 0.1 to 20 percent by weight of the combined weight of the dispersing agent and active compound.

In addition, other liquid compositions containing the desired amount of effective agent can be prepared by dissolving the toxicant in an organic liquid such as acetone, methylene chloride, chlorobenzene and petroleum distillates. The preferred organic solvent carriers are those which are adapted to accomplish the penetration and impregnation of the environment and particularly soil with the toxicant compounds and are of such volatility as to leave little permanent residue thereon. Particularly desirable carriers are the petroleum distillates boiling almost entirely under 400° F. at atmospheric pressure and having a flash point above 80° F. The proportion of the compounds of this invention employed in a suitable solvent may vary from about 2 to about 50 percent or higher.

In further embodiments, the compounds as employed in accordance with the present invention, or compositions containing the same, can be advantageously employed in the present invention in combination with one or more pesticidal or preservative compounds. In such embodiments, the pesticidal or preservative compound is employed either as a supplemental toxicant, an additament or as an adjuvant. Representative operable pesticidal or preservative compounds include substituted phenols, cresols, substituted cresols and their metal salts, bisphenol and thiobisphenols; halogenated salicylanilides, organosulfur compounds, carbamate compounds, quaternary ammonium compounds, organometallic compounds, inorganic salts and miscellaneous other compounds, such as phenol, cresol, trichlorophenols, tetrachlorophenols, pentachlorophenol, p-chloro-m-cresol, sodium pentachlorophenol and other sodium, potassium, etc. salts of the phenols, substituted phenols, cresols and substituted cresols, di- and tribrominated salicylanilides, 2,2'-methylenebis(3,4,6-trichlorophenol), 2,2'-thiobis(4,6-dichlorophenoxide), halogenated trifluoromethyl salicylanilide, disodium ethylenebisthiocarbamate, sodium N-methyldithiocarbamate, zinc dimethyldithiocarbamate, 2-mercaptobenzothiaozole, 3,5-dimethyltetrahydro-1,3,5-2H-thiadiazine-2-thione, 2,3-dinitro-1,4-dithia-anthraquinone, dodecyl pyridinium chloride, alkyl dimethyl benzyl ammonium chloride, dialkyl dimethylammonium chloride, phenylmercuric acetate, phenylmercuric oleate, phenylmercuric propionate, chloromethoxyacetoxy mercuripropane, bis-tributyltin oxide, bis-tripropyltin oxide, copper pentachlorophenate, copper 8-hydroxyquinolate, mercuric chloride, sodium borate, ethylmercuric chloride, 9-undecylenic acid, 10,10'-oxybisphenoxarsine, 1-(3-chloroallyl)-3,5,7-triaza-1-azoniaadamantane chloride, 1,4-bromobisacetobutene and substituted phosphorothioates (soil applied insecticides).

In application to an area to be treated, the compounds of this invention may be applied by spraying or by the use of mechanical spreaders in accordance with conventional practice. With respect to application, however, it will be noted that, depending upon the particular circumstances encountered, one method of application may be preferable over others. Thus, for example, for preferred pre-emergence application it has been found very satisfactory to apply the active compound in a liquid spray or on granules and incorporate it into the soil.

In a further method, the distribution can be accomplished by introducing the toxicant or toxicants into the water employed to irrigate the soil. In this method, the amount of water can be varied in accordance with the moisture equivalent or field capacity of the soil in order to obtain the desired depth of distribution of the toxicant and the soil moisture content equal to the moisture equivalent.

The following embodiments are illustrative of the present methods.

EXAMPLE 1

Forty-five parts by weight of 2,3,5-trichloro-6-(methylthio)pyrazine is mixed and ground with 5 parts by weight of Triton X–155 surfactant (an alkylated aryl polyether alcohol) to prepare a water-dispersible concentrate composition containing 90 percent by weight of the pyrazine compound.

In a further operation, 25 parts by weight of 2,3,5-trichloro-6-methoxypyrazine, 10 parts by weight of Triton X–155 surfactant and 65 parts by weight of xylene are mixed together to prepare an emulsifiable concentrate composition containing 25 percent by weight of said compound.

A mixture of 10 parts by weight of 2,3,5-trichloro-6-methylthiopyrazine, 10 parts by weight 2,3,5-trichloro-6-methoxypyrazine, 0.1 part of Nacconol NR detergent (alkyl sulfonate), 0.1 part of Daxad No. 27 (a polymerized sodium salt of benzoid alkyl sulfonic acids) and 200 parts of water are ball-milled together to prepare a water dispersible liquid concentrate composition containing 20 parts by weight of the mixed pyrazine compounds. The concentrate compositions thus prepared can be dispersed in water to prepare aqueous compositions which have very desirable wetting and penetrating properties and are adapted to distribute pre-emergent controlling or growth inhibiting amounts of the pyrazine compounds in and on soil or seeds.

EXAMPLE 2

Seven separate 200 grams samples of sandy clay loam soil are placed in separate containers. To each of these soil samples is added an acetone solution of one of the toxicants 2,3,5-trichloro-6-methoxypyrazine or 2,3,5-trichloro-6-(methylthio)pyrazine prepared by dissolving the toxicant in acetone in amounts calculated to deposit the toxicant in the soil at a rate equivalent to from 0.5 to 4 pounds per acre. The containers are sealed and rolled on a roller mill for 3 hours. Approximately one inch of the treated soils are placed on top of one inch of untreated soil in separate containers. Seeds of various plants are planted in the center of a one inch band of the treated soil. Seeds are also planted in untreated soil to serve as a control. The pots (containers) are watered and maintained in a greenhouse under conditions conducive for plant growth. Eighteen days after treatment the containers are examined for plant growth and evaluated. The results as shown in Table I indicates the percent growth control at various toxicant concentrations.

TABLE I

| Toxicant | Toxicant concentration in pounds/ surface acre | Percent pre-emergent growth control | | |
|---|---|---|---|---|
| | | Water Grass | Yellow Foxtail | Wild Mustard |
| 2,3,5-trichloro-6-(methylthio)pyrazine | 1 | 45 | 100 | |
| | 2 | 100 | 100 | |
| | 4 | 100 | 100 | |
| 2,3,5-trichloro-6-methoxypyrazine | 0.5 | 25 | 90 | 0 |
| | 1 | 100 | 100 | 20 |
| | 2 | 100 | 100 | 75 |
| | 4 | 100 | 100 | 100 |
| Control | | 0 | 0 | 0 |

EXAMPLE 3

In a continuation of Eaxmple 2, plants growing in containers are removed and plant seeds are planted in the center of the one inch band of treated soil. The pots are watered and placed in a greenhouse under conditions conducive for plant growth. Twenty-five days after re-seeding (6 weeks after initial toxicant application), the containers are examined for plant growth and evaluated. The results as set forth in Table II indicate the percent growth control at the initial toxicant concentration and also indicates the residul activity of the toxicants.

TABLE II

| Toxicant | Initial toxicant concentration in pounds/ surface acre | Percent pre-emergent growth control | | |
|---|---|---|---|---|
| | | Water Grass | Yellow Foxtail | Pigweed |
| 2,3,5-trichloro-6-(methylthio)pyrazine | 2 | 30 | 45 | 100 |
| | 4 | 100 | 100 | 100 |
| 2,3,5-trichloro-6-methoxypyrazine | 2 | 60 | 45 | 100 |
| | 4 | 100 | 100 | 100 |
| Control | | 0 | 0 | 0 |

In a continuation of this example, pots treated with 2,3,5-trichloro-6-methoxypyrazine in concentrations of 1.0, 0.5 and 0.25 pound per surface acre control the growth of pigweeds in an amount of 100, 100, 85 percent, respectively.

EXAMPLE 4

Aqueous dispersions are prepared from 2,3,5-trichloro-6-methoxypyrazine and 2,3,5-trichloro-6-(methylthio) pyrazine toxicants by dissolving each of the compounds in acetone to prepare a concentrate, having predetermined amount of the toxicant. The resulting concentrates are diluted with water and applied as a drench to pots containing sandy soil in which are planted seeds of 14 plants species. The drenches are applied to the pots at rates calculated to deposit the toxicant in the soil in a predetermined amount within the range of from 50 pounds per acre to 10 pounds per acre. The pots are maintained under conditions conducive for plant growth for a period of two weeks. The pots are examined to determine the extent of control as indicated by the germination of seeds and growth and compared with control operations where the seeds are planted in untreated soil, i.e., drenched with an unmodified acetone-water mixture. The results as set forth in Table III indicate the percent seed germination control of the pyrazine compounds at various toxicant concentrations whereas no control, but good germination and growth is obtained in the untreated soil.

TABLE IV.—PERCENT PRE-EMERGENT CONTROL OF SEED GERMINATION AT VARIOUS INDICATED TOXICANT CONCENTRATION (IN POUNDS PER SURFACE ACRE)

| Seed species | 2,3,5-trichloro-6-methoxypyrazine | | | | | | | | 2,3,5-trichloro-6-(methylthio)pyrazine | | | | | | | | Control |
|---|---|---|---|---|---|---|---|---|---|---|---|---|---|---|---|---|---|
| | 10 | 5 | 2.5 | 1.25 | 0.62 | 0.31 | 0.15 | 0.08 | 10 | 5 | 2.5 | 1.25 | 0.62 | 0.31 | 0.15 | 0.08 | |
| Peanut | 100 | 99 | 90 | 90 | 95 | 100 | 50 | | 60 | 60 | 40 | 50 | | | | | 0 |
| Pigweed | 100 | 100 | 100 | 100 | 100 | 100 | 100 | 100 | 100 | 100 | 100 | 100 | 100 | 100 | 100 | 100 | 0 |
| Wild Mustard | 100 | 100 | 100 | 100 | 100 | 80 | | | 90 | 100 | 100 | 50 | | | | | 0 |
| Buckwheat | 100 | 100 | 100 | 100 | 100 | 40 | | | 100 | 100 | 100 | 100 | 90 | 100 | | | 0 |
| Soybean | 99 | 99 | 95 | 80 | 40 | | | | 99 | 99 | 95 | 60 | 20 | | | | 0 |
| Cotton | 100 | 100 | 100 | 100 | 100 | 100 | | | 100 | 100 | 100 | 100 | | | | | 0 |
| Wheat | 100 | 100 | 100 | 100 | 90 | 80 | | | | | | 80 | | | | | 0 |
| Corn | 100 | 100 | 80 | 80 | | | | | 100 | 60 | 60 | 40 | | | | | 0 |
| Bindweed | 100 | 100 | 100 | 100 | 100 | 40 | | | 100 | 100 | 90 | 90 | 50 | | | | 0 |
| Sorghum/Milo | 100 | 100 | 100 | 100 | 100 | 60 | 30 | | 100 | 100 | 100 | 100 | 80 | 30 | | | 0 |
| Johnson Grass | 100 | 100 | 100 | 100 | 90 | | | | 100 | 100 | 100 | 90 | | | | | 0 |
| Barnyard Grass | 100 | 100 | 100 | 100 | 100 | 100 | 100 | 60 | 100 | 100 | 100 | 100 | 100 | 90 | 50 | | 0 |
| Sugar Beets | 100 | 100 | 100 | 100 | 100 | 100 | 90 | | 100 | 100 | 100 | 100 | 100 | 95 | 90 | 40 | 0 |
| Wild Oats | 100 | 100 | 100 | 100 | 100 | 40 | 40 | | 100 | 95 | 40 | 30 | | | | | 0 |
| Yellow Foxtail | 100 | 100 | 100 | 100 | 90 | 40 | 30 | | 100 | 100 | 100 | 100 | 60 | | | | 0 |
| Rice | 100 | 100 | 100 | 100 | 100 | 99 | 70 | 50 | 100 | 100 | 100 | 100 | 100 | 90 | 30 | | 0 |
| Morning Glory | 100 | 100 | 99 | 100 | 80 | | | | 100 | 80 | 50 | | | | | | 0 |
| Crabgrass | 100 | 100 | 100 | 100 | 100 | 100 | 30 | | 100 | 100 | 100 | 100 | 100 | 100 | 50 | | 0 |

TABLE III.—PERCENT PRE-EMERGENT CONTROL OF SEED GERMINATION AT VARIOUS INDICATED TOXICANT CONCENTRATIONS (IN POUNDS PER SURFACE ACRE)

| Seed species | 2,3,5-trichloro-6-methoxypyrazine | | | | | 2,3,5-trichloro-6-(methylthio)pyrazine | | | | Control |
|---|---|---|---|---|---|---|---|---|---|---|
| | 50 | 20 | 5 | 2.5 | 2 | 1 | 50 | 20 | 5 | 2 |
| Cucumber | | 100 | 100 | 100 | 100 | 70 | | 100 | 100 | | 0 |
| Radish | 100 | 100 | 100 | | 90 | 10 | 100 | | | | 0 |
| German Millet | | 100 | 100 | 100 | 100 | 70 | | 100 | 100 | 100 | 0 |
| Wheat | 100 | 100 | 100 | 100 | 195 | 40 | 100 | 20 | | | 0 |
| Crabgrass | | 100 | 100 | 100 | 100 | 90 | | 100 | 100 | 100 | 0 |
| Corn | 100 | 100 | 100 | 100 | 100 | 90 | 100 | 100 | 100 | 100 | 0 |
| Pinto Bean | | 100 | 100 | | 90 | | 100 | 100 | | | 0 |
| Marigold | | 100 | 100 | 100 | 100 | | | 100 | 100 | 90 | 0 |
| Sudan Grass | | 100 | 100 | 100 | 100 | | | 100 | 100 | 100 | 0 |
| Meadow Fescue | | 100 | 100 | 100 | 100 | 100 | | 100 | 100 | 100 | 0 |
| Beans | 100 | 100 | 100 | 80 | 99 | | 100 | 100 | 100 | | 0 |
| Japanese Millet | 100 | 100 | 100 | 100 | 100 | 95 | 100 | 100 | 100 | 100 | 0 |
| Wild Oats | 100 | 100 | 100 | 90 | 100 | 60 | 100 | 100 | 20 | | 0 |
| Pigweed | | 100 | 100 | 100 | 100 | 100 | | 100 | 100 | 100 | 0 |

EXAMPLE 5

In another operation, aqueous dispersions of 2,3,5-trichloro-6-methoxypyrazine and 2,3,5-trichloro-6-(methylthio)pyrazine are prepared by dissolving each in acetone to form concentrates having a predetermined amount of the toxicant. The resulting concentrates are diluted with water and applied as a drench to pots containing sandy soil at rates calculated to deposit the toxicant in the soil in amounts ranging from 10 pounds per acre to 0.08 pound per acre to a depth of one inch. Seeds of eighteen plant species are placed on the treated soil surface immediately as well as on the surface of untreated soil (which serves as a control) and the pots are mulched with sand. The pots are watered and maintained under conditions conductive to germination and growth. Three weeks after planting, the treated and untreated pots are examined to determine the extent of control as indicated by germination of seeds and growth of plants. The results are set forth in Table IV.

The following studies show the preparation of the pyrazine compounds employed in the practice of the present invention.

Sodium metal (1 gram, 0.046 mole) was dissolved in 75 milliliters of methanol to prepare a methanolic solution of sodium methylate. The latter solution was added dropwise with stirring over a period of about 45 minutes to a solution of 10 grams (0.046 mole) of tetrachloropyrazine in 125 milliliters of methanol. During this period the reaction mixture was maintained at a temperature of from about 15° to 20° C. Immediately thereafter the reaction mixture was allowed to warm to 25°–27° C. and maintained at such temperature with stirring for about 30 minutes. During the reaction period sodium chloride precipitated from the reaction mixture and on completion of the reaction this solid by-product was separated by filtration. The filtrate was concentrated under vacuum and mixed with cold water to precipitate the 2,3,5-trichloro-6-methoxypyrazine product as a solid, melting at 33°–35° C.

Methanethiol (1.44 grams, 0.03 mole) and 0.69 gram (0.03 mole) of sodium metal were dissolved in about 200 milliliters of isopropyl alcohol and the resulting solution added slowly at room temperature to a solution of 6.5 grams (0.03 mole) of tetrachloropyrazine in about 100 milliliters of isopropyl alcohol. Rapid reaction ensued as evidenced by the formation of a precipitate. The addition of the reactants was accomplished over a period of about 85 minutes. Thereafter the reaction mixture was stirred at room temperature for about two hours after which it was poured onto ice to precipitate the 2,3,5-trichloro-6-(methylthio)pyrazine as a white solid having a melting point of 43–44° C. Elemental analysis for carbon, hydrogen, nitrogen, sulfur and chlorine confirmed the composition of the product.

The tetrachloropyrazine employed as a starting material in preparing the compounds of the present invention can be prepared by the direct chlorination of pyrazine by known methods such as the method taught in U.S. Pat. No. 2,442,473.

What is claimed is:

1. A method for providing pre-emergent control of plant growth comprising applying to a soil area to be protected from said plant growth a growth inhibiting amount of at least one pyrazine compound of the group consisting of 2,3,5-trichloro-6-methoxypyrazine or 2,3,5-trichloro-6-(methylthio)pyrazine.

2. The method according to claim 1 wherein the pyrazine compound is 2,3,5-trichloro-6-methoxypyrazine.

3. The method according to claim 1 wherein the pyrazine compound is 2,3,5 - trichloro-6-(methylthio)-pyrazine.

4. The method according to claim 1 wherein the pyrazine compound is in intimate admixture with a pesticidal adjuvant as a carrier thereof.

5. The method according to claim 4 wherein the adjuvant is one of a coarsely divided solid or a finely divided solid.

6. The method according to claim 4 wherein the adjuvant is a liquid.

7. A composition for the pre-emergent control of plant growth which comprises as the active growth inhibiting agent one of 2,3,5-trichloro-6-methoxypyrazine or 2,3,5-trichloro-6-(methylthio)pyrazine in an amount sufficient to inhibit said plant growth in admixture with an inert pesticidal adjuvant as a carrier thereof.

8. The composition as defined in claim 7 wherein the active growth inhibiting agent comprises 5 to 95 percent by weight of the total composition.

9. The composition as defined in claim 7 wherein the active growth inhibiting agent is 2,3,5-trichloro-6-methoxypyrazine.

10. The composition as defined in claim 7 wherein the active growth inhibiting agent is 2,3,5-trichloro-6-(methylthio)pyrazine.

References Cited

UNITED STATES PATENTS

| 3,169,848 | 2/1965 | Gysin et al. | |
| 2,442,473 | 6/1948 | Sayward et al. | 260—250 |
| 3,185,686 | 5/1965 | Camerino | 260—250 |
| 3,328,402 | 6/1967 | Winter | 260—250 |
| 3,340,262 | 9/1967 | Gagliardi | 260—250 |

FOREIGN PATENTS 610,487  12/1960  Canada.

OTHER REFERENCES

Baxter et al., "Oxidation of 2-Ethoxy and 2-Chloropyrazine Discs with $H_2O_2$" (1948), CA 43, p. 3005–6 (1949).

LEWIS GOTTS, Primary Examiner

G. HOLLRAH, Assistant Examiner

U.S. Cl. X.R.

71—3, 87, 90